United States Patent
Zoppi

[19]

[11] Patent Number: 6,159,356
[45] Date of Patent: Dec. 12, 2000

[54] PROCESS FOR THE PRODUCTION OF HIGH PURITY COPPER METAL FROM PRIMARY OR SECONDARY SULPHIDES

[75] Inventor: Gianni Zoppi, Dino di Sonvico, Switzerland

[73] Assignee: Ecochem Aktiengesellschaft, Triesen, Liechtenstein

[21] Appl. No.: 09/059,569

[22] Filed: Apr. 14, 1998

[30] Foreign Application Priority Data

Apr. 14, 1997 [CH] Switzerland ............... 0862/97
Aug. 11, 1997 [CH] Switzerland ............... 1886/97

[51] Int. Cl.[7] .................................. C25C 1/12
[52] U.S. Cl. ........................... 205/582; 205/586
[58] Field of Search ................. 204/574, 580, 204/582, 586, 560

[56] References Cited

U.S. PATENT DOCUMENTS

| | | | |
|---|---|---|---|
| 1,808,547 | 6/1931 | Greenawalt | 205/580 |
| 3,879,272 | 4/1975 | Atwood et al. | 204/107 |
| 4,536,214 | 8/1985 | Ochs et al. | 75/101 |
| 4,632,738 | 12/1986 | Beattie et al. | 204/107 |
| 5,039,337 | 8/1991 | Olper et al. | 75/725 |
| 5,372,684 | 12/1994 | Zoppi | 204/107 |
| 5,750,019 | 5/1998 | Olper | 205/563 |
| 5,762,683 | 6/1998 | Jackson et al. | 75/743 |
| 5,935,409 | 8/1999 | King et al. | 205/580 |

OTHER PUBLICATIONS

P. K. Everett, Development of Intec copper process by an international consortium, Hydrometall. '94, Pap. Int. Symp., (abstract), Chapman & Hall: London, UK (1994). No month available.

*Primary Examiner*—Donald R. Valentine
*Attorney, Agent, or Firm*—Pillsbury Madison & Sutro Intellectual Property Group LLP

[57] ABSTRACT

This process treats copper concentrates, either in the form of a primary sulfide, such as chalcopyrite, or a secondary sulfide, such as chalcocite and covellite, to obtain high purity copper metal having not less than 99.99% purity. In the case of a primary sulfide, the copper concentrate is subjected to leaching and is transformed into cement or a precipitated sulfide. In the case of the secondary sulfide, the copper concentrates are subjected to leaching with ferric fluoborate and fluoboric acid. Subsequent to leaching, the solution is subjected to copper electrowinning in a diaphragm cell to deposit copper on the cathode of the diaphragm cell.

5 Claims, 2 Drawing Sheets

PROCESS FOR THE PRODUCTION OF HIGH PURITY COPPER METAL FROM PRIMARY OR SECONDARY SULPHIDES

BACKGROUND OF THE INVENTION

The use of chlorides for the oxidation, solubilization, and recovery of Cu from its secondary or primary sulphide concentrated ore, such as chalcopyrite, from mixed concentrates or from mattes, has been studied and proposed for more than one hundred years to overcome the pyrometallurgical process, that has a serious impact on the environment.

Leaching using chlorides, in particular $FeCl_3$ and $CuCl_2$, is by now acknowledged as a very efficient method for the production of concentrated solutions from which to extract Cu directly.

Even with the more refractory sulphides, such as chalcopyrite, the extraction yields are high. The sulphur is produced mostly in elemental form and therefore the conditions exist for a large scale application of this technology.

Despite this, industrial experience has so far been a total failure.

To better understand the reasons it is necessary to examine the characteristics of the most common processes. The Canmet, Minemet Recherche, Broken Hill processes combine leaching using $CuCl_2$ at atmospheric pressure, with solvent extraction of copper from chloride solution and Cu electrowinning from sulphuric baths.

The Cymet process (U.S. Pat. No. 3,901,776) uses a mixture of $FeCl_3$ and $CuCl_2$ as the leaching medium. The CuCl obtained is precipitated from the solution and reduced to Cu metal by using a flow of hydrogen in a fluid bed reactor.

The Duval Clear process and the U.S.B.M. process also use leaching medium based on $CuCl_2$ and $FeCl_3$ to produce a CuCl solution that is electrolysed in a diaphragm cell.

The Cu, which is deposited in incoherent form, is removed continuously.

The $CuCl_2$ is regenerated in the anodic compartment. The purity of the copper produced in this way is insufficient and further electrolytic purification is required.

The Dextec process causes anodic dissolution of the Cu in presence of oxidants. The reaction takes place in a diaphragm cell; the copper sponge, containing the impurities of the starting material, is deposited in the cathode compartment.

The Elkem process leaches the mixed concentrates of Cu with Zn and Pb in a ferric and cupric chloride solution, which operates in counter-current. Cu is recovered in sponge form by electrowinning. In a recent modification of the process there is a production of a $CuCl_2$ solution, from which the copper is separated by solvent extraction before the electrowinning stage, thereby improving the quality of the Copper produced.

In this process Zn is extracted from the leaching solution using tributylphosphate. Pb is separated as $PbCl_2$. The process is very complicated: there are problems with the solvent extraction circuits and the physical form of the metals obtained is unsuitable for direct sale, without further processing.

The Cuprex process uses a solution based on NaCl with $FeCl_3$ to dissolve the copper sulphides, obtaining a $CuCl_2$ solution. The Cu is extracted using solvents in a 3 stage extraction that operates in counter-current.

Stripping from the solvent is performed using water, producing a concentrated solution of $CuCl_2$ which is transferred to the electrolytic diaphragm cell. The copper produced is in a sponge, or granular form (that is a commercial cathode) and the process operations are rather complex.

The Intec process performs leaching using an oxidising solution of chlorides containing bromine chloride. After the solution purification using lime, copper is electrolitically extracted in granular form in an ion-selective membrane cell. The copper produced, even though of good quality, is not saleable without undergoing further treatment which transforms it into a finished product.

Among all these processes and the numerous patents having the same goal only Clear process has achieved industrial scale application and produced 32.000 t Cu/year for a certain period.

However, it too had to be shut-down for various technical and economical reasons.

The chloride hydrometallurgy has successfully overcome the drawback of leaching Cu sulphide concentrated ore, but, anyway, has not yet found the complete solution to produce copper cathodes of acceptable quality, with economic costs that are competitive with pyrometallurgy.

The primary purpose of this invention is to provide a process to produce copper in the form of thick, compact, smooth surface and high purity cathodes (at least 99.99%) from Cu sulphide concentrated ore, from copper mattes and from precipitated copper sulphides. In addition to the copper having the characteristics detailed above, according to the purposes of the invention, sulphur in an elementary form must be produced.

SUMMARY OF THE INVENTION

To achieve this objective, and other advantages that will become clear from the present description, the invention proposes a process to treat copper ore, in the form of primary sulphide, as in chalcopyrite, or secondary sulphide as in chalcocite and covellite to obtain high parity copper metal, not less than 99.99%, characterised by subjecting the said copper ore, transformed it in the form of cement, or precipitated sulphide in the case of primary sulphide, or, as is in the case of secondary sulphide, to the direct leaching with ferric fluoborate and fluoboric acid, and by subjecting the solution thus obtained to diaphragm cell electrowinning with deposit to the cathode of the said high purity copper metal.

In accordance with a first implementation of the invention, the chalcopyrite flotation concentrate is leached at atmospheric pressure by the hot $CuCl_2$ solution, having a medium concentration. A suitable excess of chalcopyrite with respect to the leaching solution is necessary so that the outgoing solution only contains CuCl. The high extraction yield of Cu is ensured, by counter-current leaching the concentrate in a second stage with the fresh leaching solution. Filtering separates the copper solution from the insoluble residue, which also contains elemental sulphur.

This residue is eventually treated using known techniques to extract the sulphur and after being thoroughly washed, it is inert with respect to the environment and can be disposed without any problem. If precious metals other than Ag are present, the residue may be recycled to extract these metals. According to this process, ¼ of the volume of the copper solution is subject to copper precipitation, either by cementation with iron, or as sulphide and the copper precipitate, previously treated with dilute HCl to dissolve the possible residual iron and afterwards washed with water to remove the chlorides, is transferred to the electrowinning plant for producing copper cathodes.

The remaining copper chloride solution, after addition to the resultant solution from iron cementation, is subject to an intense air flow at atmospheric pressure to oxidise the dissolved iron. The pH value slowly increases from 1 to 2 and under these conditions a crystalline precipitate of FeO.OH is obtained, which is readily filtered and washed, whereas the CuCl oxidises to $CuCl_2$, restoring the leaching solution for recycling to the initial stage.

The precipitated copper is dissolved in the $Fe(BF_4)_3$ and $HBF_4$ solution, coming from the diaphragm where Cu deposition is performed in the cathodic compartment and regeneration of the ferric salt, necessary for process continuity, is effectuated in the anodic compartment.

BRIEF DESCRIPTION OF THE DRAWINGS

The accompanying drawings illustrate aspects of this invention. In such drawings.

DETAILED DESCRIPTION OF THE INVENTION

Figure 1:
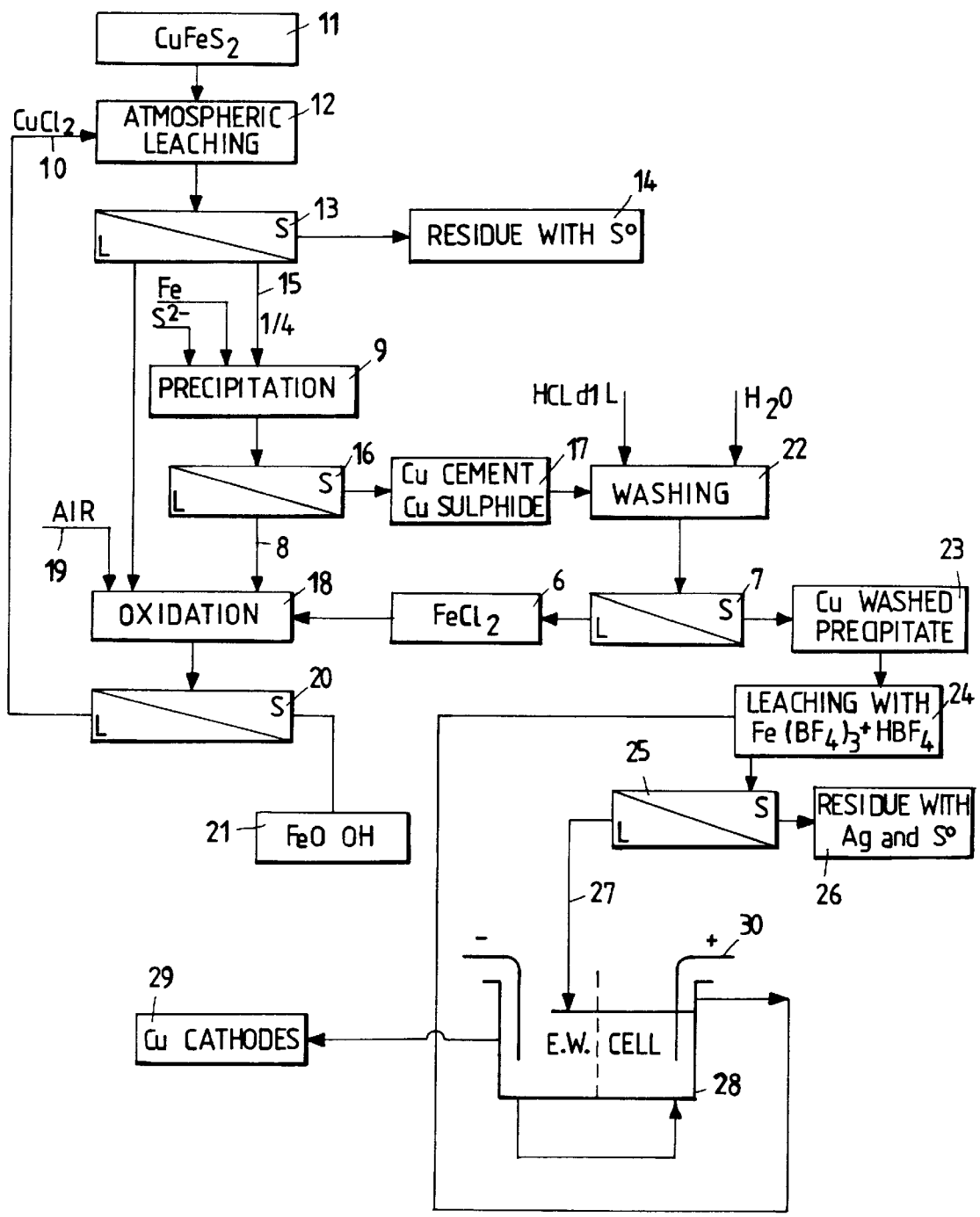
FIG. 1 is a flow diagram of the inventive process in accordance with an embodiment of the invention.

Hereunder the process is described in greater detail, making reference to the flow diagram shown in FIG. 1 of the attached drawing, to better describe the characteristics and the advantages of the invention in its implementation above summarised.

a) The fresh leaching solution (10) contains some 100 to 200 g/l NaCl, 50 to 100 g/l $CuCl_2$ and a minimum quantity of HCl, sufficient to maintain the pH=1 during the reaction. The chemical reaction (12) to dissolve the chalcopyrite (11) may be represented as follows:

$$3CuCl_2+CuFeS_2 \rightarrow 4CuCl+FeCl_2+2S° \qquad (1)$$

By maintaining the solution at around 100° C., the reaction is completed within 1.5–2 hours. Hence, the reacted solution contains all the Cu in cuprous form, in addition to the $FeCl_2$. This is fundamental for the economy of both the cementation phase with Fe, and the precipitation as sulphide, and it is achieved by maintaining sufficient chalcopyrite in excess, before filtering, which exerts its reducing effect on the solution.

The Cu extraction yield regularly exceeds 95%, taking into account the double counter-current leaching using the leaching solution already used for the concentrate; obviously this is dependent on the degree of purity of the processed mineral and its grain size distribution. Ag possibly present in the chalcopyrite also goes into solution. The leaching residue (14) may be subject to sulphur recovery, or after being thoroughly washed, may be discharged with the tail flotation residues. However, if the concentrated ore contains precious metals other than Ag, these remain in the residue, which may be sent for extraction of these metals.

b) The CuCl and $FeCl_2$ solution, filtered in (13), in the proportion of ¼ of the total volume (indicated by 15) is transferred to the cementation stage (9) with iron, or to precipitation as sulphide.

The reaction:

$$2CuCl+Fe \rightarrow 2Cu+FeCl_2 \qquad (2)$$

$$2CuCl+S^{2-} \rightarrow Cu_2S+2Cl^- \qquad (2a)$$

is completed in a few minutes, if the solution is continuously mixed and the iron consumption is approximately 50 to 60% by weight of the Cu product. Ag possibly present is cemented, or precipitated together with Cu as sulphide.

With filtering (16), the copper cement, or the $Cu_2S$ precipitate (17) is separated out of the $FeCl_2$ solution (8), which is mixed with the not utilized leaching solution.

The obtained chloride solution, goes to the oxidation stage (18) with air (19) to regenerate the $CuCl_2$ and the iron precipitation.

The reaction:

$$2CuCl+FeCl_2+¾O_2+½H_2O \rightarrow CuCl_2+FeO.OH \qquad (3)$$

takes place at about 80° C. maintaining air insufflation until reaching pH=2, but without exceeding pH=2,5 to prevent precipitation of Cu oxychloride. The FeO.OH precipitate is crystalline and is readily filtered.

Once the reaction is completed the Fe oxyhydrate (21) is separated by filtering (20) and the clear solution (10) contains all the $CuCl_2$ necessary for a new cycle once the losses, due to the purge for the accumulated impurities (especially Zn), have been made up.

The copper cement, or sulphide (17) obtained with reaction (2) and (2a) and separated by filtering, must be washed with diluted HCl to remove residual iron and with water to remove the chlorides. Thus purified in (22) and filtered in (7) with the recovery of $FeCl_2$ (6) recirculated in (18), it goes to the copper electrowinning cells, which include the following stages:

d) the purified copper cement (23) is leached in (24) with a ferric fluoborate solution in fluoboric acid, according to the following reaction:

$$2Fe(BF_4)_3+Cu \rightarrow 2Fe(BF_4)_2+Cu(BF_4)_2 \qquad (4)$$

In the event the copper precipitates as sulphide, the solubilisation reaction is the following:

$$4Fe(BF_4)_3+Cu_2S \rightarrow 2Cu(BF_4)_2+4Fe(BF_4)_2+S \qquad (4a)$$

The resultant solution is filtered in (25) (Ag is concentrated in the residue 26);

e) the copper solution (27) is fed to an electrolytic diaphragm cell (28) in which the Cu is deposited on the cathode (29) in pure form and the ferrous ions are oxidised to ferric ions at the anode (30), consequently regenerating the solution necessary for a new leaching cycle.

The electrochemical reactions that take place in the cell may be represented as follows:

$$\text{At the cathode}: Cu(BF_4)_2+2e \rightarrow Cu+2BF_4^-$$

$$\text{At the anode}: 2Fe(BF_4)_2+2BF_4^- -2e \rightarrow 2Fe(BF_4)_3$$

and $$\text{overall}: 2Fe(BF_4)_2+Cu(BF_4)_2 \rightarrow Cu+2Fe(BF_4)_3 \qquad (5)$$

A practical example of the process is provided, according to the implementation above described.

EXAMPLE a) Leaching 1000 cc solution with the following composition:

$Cu^{2+}$ 50 g/l

NaCl 180 g/l pH 1.3 (for HCl)

The solution is heated to a temperature close to 100° C. 56 g of Cu concentrate with the following composition are added to this solution:

Cu 30.6%
Fe 27.2%
S 31.8%

The above is reacted for 2 hours at 95° C., afterwhich it is filtered, the residue is washed thoroughly and the following are recovered:

- −24.6 g of washed and dried residue containing:
  Cu 2.20%
  Fe 3.50%
  S 72.60%
- −1040 cc of solution, also containing the residue washing water, with the following composition:
  $Cu^+$ 66.7 g/l (some $Cu^{2+}$ traces)
  $Fe^{2+}$ 14.5 g/l
  NaCl 172 g/l
  pH 1.42

One quarter of this solution is transferred to the cementation, or to the precipitation stage as sulphide, the remainder is transferred directly to oxidation.

b) Cementation 250 cc of solution, originating from concentrated ore leaching, are placed in a reactor and heated to a temperature of 70° C.

Then, 8 g of Fe powder are added and are left for 60' while being stirred vigorously.

Afterwhich the following are recovered:

- −280 cc of solution, including the cement wash water, with the following composition:
  Cu 50 mg/l
  Fe 40.7 g/l
  pH 1.63
- −17,4 g of cements with the following composition:
  Cu 94.4%
  Fe 3.8%

The Fe consumption in this phase is about 0.487 kg Fe/kg of precipitated Cu. The solution leaving this phase is added to the remaining solution and transferred to the oxidation stage.

b1) Sulphide Precipitation 250 cc of solution originating from concentrated ore leaching, are placed in a reactor, stirred and maintained at 70° C.

4.46 g. of $H_2S$, diluted with $N_2$ in a 1:10 ratio, are bubbled through a glass frit for 30'.

The precipitation of dark brown coloured copper sulphide is observed immediately, which turns to black after 30'.

The reactor stirring is continued for a further 10' after the end of the gas addition phase.

The solid obtained is filtered on filter paper under vacuum and the solid material is washed with water.

At the end 275 cc of solution are recovered with the following composition:
Cu=164 mg/l
Fe=40.2 g/l
pE=0.95

The solid obtained, washed with acetone and dried at 40° C., weights 21.03 g. and has the following composition:
Cu=79.07%
S=20.44%

It is apparent from the Cu/S molar ratio that the precipitate consists of virtually pure $CU_2S$.

c) Fe Oxidation and Regeneration of the Leaching Solution 1070 cc of solution with the following composition:
$Cu^+$ 49.2 g/l (with $Cu^{2+}$ traces)
$Fe^{2+}$ 21.4 g/l
pH 1.52 are placed in a reactor and heated to 85° C.

Air, at a flow rate of 1.5 l/min., is bubbled in this reactor through a glass frit as the distributing medium. After a few minutes it can be observed the presence of an orange precipitate, which increases in time. The pH initially increases and then varies over a range of 1.9 and 2.2.

After a reaction time of 1 hour, a sludge is obtained which is filtered, thereby obtaining:

- −1110 cc of solution, containing the residue washing water, with the following composition:
  $Cu^{2+}$ 46.2 g/l
  $Cu^+$ 1.2 g/l
  $Fe^{2+}$ 2.0 g/l
  pH 2.14
- −31,0 g of washed and dried residue, consisting of FeO.OH.

The solution leaving this stage may be fed back to the leaching reactor.

d) Fluoboric Leaching of Cement Copper

The cements produced in the cementation phase are placed in a solution containing CuCl and originating from the concentrate leaching stage to reduce the Fe content of the cements to a minimum.

In this way 18.6 g. of Cu, containing a quantity of Fe<0.1% are obtained.

This cement is leached in 2 litres of fluoborate solution with the following composition:
$Cu^{2+}$ 18.32 g/l
$Fe^{2+}$ 24.1 g/l
$Fe^{3+}$ 16.4 g/l
free $HBF_4$ 120 g/l The above is reacted for 30' at 50° C. and then filtered. There is a minimum residue and it contains the silver present in the starting mineral and the outgoing solution has the following composition:
$Cu^{2+}$ 27.52 g/l
$Fe^{2+}$ 40.3 g/l
$Fe^{3+}$ 0.2 g/l d1) Fluoboric Leaching of Copper Sulphide The copper sulphide is reacted in 2 liters of fluoborate oxidising solution having the same composition of that of the previous example.

The sulphide is completely dissolved after 10' at 50° C. while stirring and the elemental sulphur rises to the surface of the solution.

After filtering the elemental sulphur, a fluoboric solution with the following composition is obtained:
Cu=26.71 g/l
$Fe^{2+}$=40.4 g/l
$Fe^{3+}$=0.1 g/l The filtering residue, consisting of the elemental sulphur, after washing and drying weighs 4.5 g.

Analysis gives the following results:
Cu=0.09%
Ag=1.22%

This example demonstrates that the silver contained in the starting concentrate collects in the elemental sulphur residue making easier the metal recovery.

e) Fluoborate Electrolysis

The two 1 liter compartments of a diaphragm cell are fed with 2 liters of solution, one of which originates from cement leaching and one from sulphide dissolution.

An AISI 316 cathode is submerged in the cathodic compartment on which copper is deposited in microcrystalline and compact form.

A graphite anode, on which the $Fe^{2+}$ will be oxidised to $Fe^{3+}$, is immersed in the anodic compartment.

Both compartments are equipped with an air sparging system.

The electrolysis temperature is about 50° C., maintained by a hot water heat exchanger.

The electrode surfaces are about 30 cm² and the current supplied is 0.9 A to work at a current density of 300 A/m².

The electrolysis test lasted 7 hours providing the following results:

7.20 g of Cu deposited (96.4% cathode yield) in a very flat form with micro-crystalline texture 13.05 g of $Fe^{3+}$ produced at the anode (99.2% anode yield).

The solution leaving the anolyte, with 13.2 g/l of $Fe^{3+}$, may be used to leach other copper cement or sulphide.

The purity of the cathode deposit is >99.99%.

According to a different implementation of the invention, the electrochemical system described to refine the cement copper, or the precipitated sulphides is capable to process directly secondary copper sulphides, ores such as chalcocite and covellite.

Figure 2:
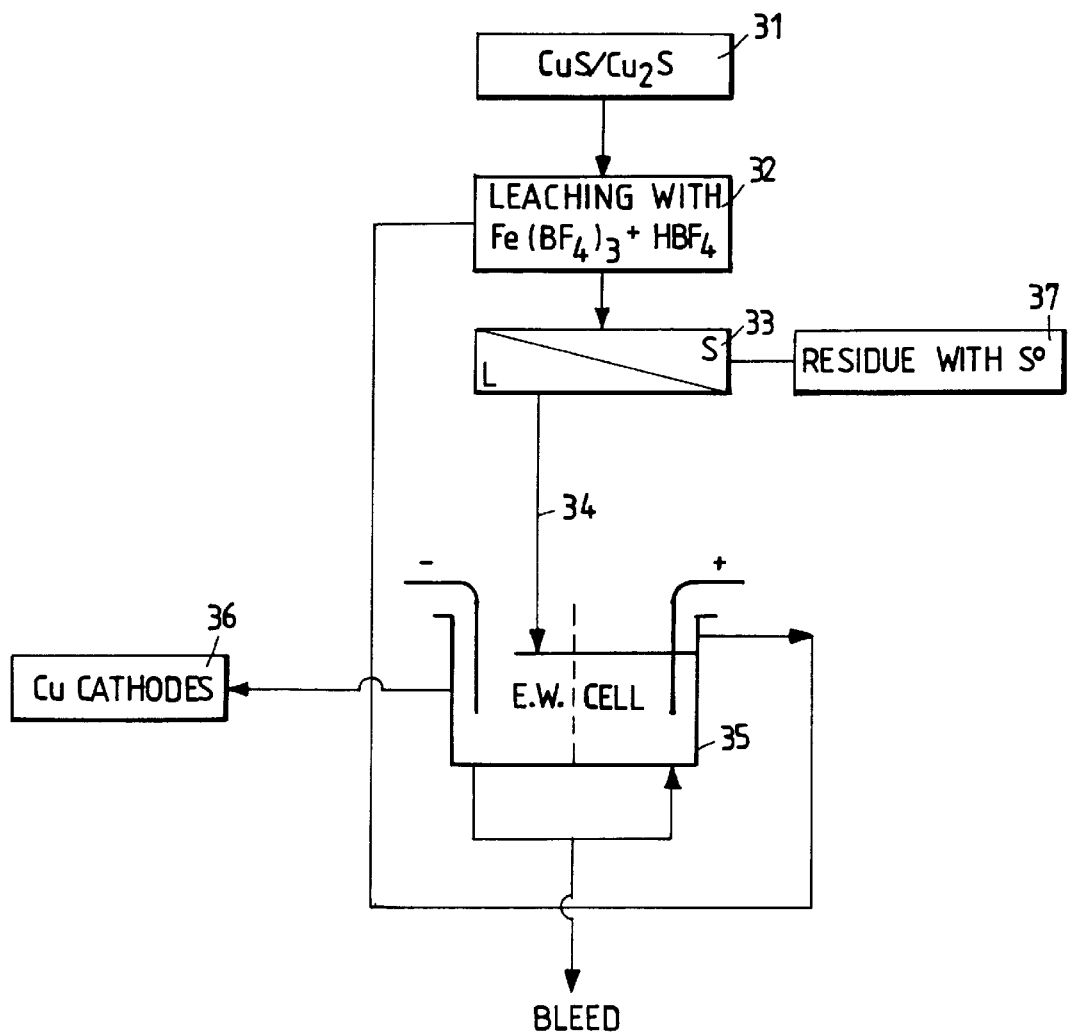
FIG. 2 is a flow diagram of the inventive process in accordance with another embodiment of the invention.

For the purposes of explanation and being unrestrictive, an example of this different implementation of the process described in the invention is reported, with reference to the flow diagram of FIG. 2 of the attached drawing.

The reactions that occur when leaching (32) secondary sulphides (31) using ferric fluoborate and fluoboric acid, are as follows:

Covellite $CuS+2Fe(BF_4)_3 \rightarrow Cu(BF_4)_2+2Fe(BF_4)_2+S°$ (6)

Chalcocite $Cu_2S+4Fe(BF_4)_3 \rightarrow 2Cu(BF_4)_2+4Fe(BF_4)_2+S°$ (7)

After filtering (33) the residue (37) containing the elemental sulphur, the solution (34) is transferred directly to the copper electrowinning cell (35) (at cathode 36). The highly simplification of the process for these sulphide concentrated ores is obvious, and the same results, in the quality of the copper cathode produced, are obtained.

For the purposes of a general evaluation of the process described in the invention it remains to be mentioned that the fluoboric electrolyte, contrary to other electrolytes, such as the hydrochloric and the sulphuric ores, has the characteristic of forming complexes with the metal ions present in solution, with a complex forming power that is proportional to the density of ionic charge. This characteristic is of fundamental importance in this invention. In fact, on the one hand, the metal deposit from a complex improves the quality of the deposit, by refining the crystalline grain and therefore by reducing the possible inclusion of impurities in the cathode.

On the other hand, the powerful complexing effect of the $BF_4^-$ ion on the $Fe^{3+}$ ion prevents the iron in the oxidised form to pass from the anodic to the cathodic compartment, in which it could dissolve the Cu deposit, with serious consequences on current yield and, at last, on energy consumption in the electrowinning process. Therefore, in this type of process, the use of very low cost polyolefinic diaphragms is permitted.

From the considerations described above the advantages of the process in this invention compared to the known techniques are clear:

The equipment required for the various phases of the process are simple and they operate at atmospheric pressure and with temperatures not exceeding 100° C.

The consumption of reagents is limited: it is reduced to the replacing of small mechanical losses and possible "purge". The iron used up for cementation is only some 50–60% by weight with respect to the Cu produced. At the same time, the quantity of sulphide necessary to precipitate the copper is reduced by half.

In this process the complicated and costly copper extraction phase using organic solvents, typical of all the existing hydrometallurgic processes, is eliminated.

Energy consumption for electrowinning is about 30% lower than conventional electrowinning processes (sulphatic), with $O_2$ evolution.

The formation of acid mists during electrolysis is eliminated.

Compared to the sulphatic electrowinning, the costly addition of $Co^{++}$ to the electrolyte, is also avoided.

The final residues of the process are inert, as far as toxic tests are concerned. Only in the case of precious metals, other than Ag, they must be treated in order to recover these metals.

The sulphur contained in the sulphides is transformed into its elemental form, which is the most readily usable form and, anyway, is the most convenient form for storage.

Fe oxyhydrate FeO.OH is a residue that may be reutilised in the process itself, by reducing it thermally to Fe sponge, which can be used in the cementation phase.

The Cu produced is of the highest electrolytic quality with regard to the cathode thickness, compactness and surface smoothness, with much lower impurity levels compared to the limits set for grade A Copper.

The copper cathodes produced by this process are sulphur free.

What is claimed is:

1. A process for obtaining purified copper metal from a copper concentrate comprising:

(a) leaching chalcopyrite with cupric chloride to obtain a copper chloride solution according to equation (1), then separating elemental sulfur from the copper chloride solution, said equation (1) being as follows:

$3CuCl_2+CuFeS_2 \rightarrow 4CuCl+FeCl_2+2S°$ (1);

(b) reacting approximately one-fourth of the copper chloride solution obtained from said leaching (a) with either iron to precipitate a solid copper cement in accordance with equation (2a) or a sulfide to precipitate a copper sulfide precipitate in accordance with equation (2b), then filtering out the solid copper cement or the copper sulfide precipitate, said equations (2a) and (2b) being as follows:

$2CuCl+Fe \rightarrow 2Cu+FeCl_2$ (2a), and $2CuCl+S^{2-} \rightarrow Cu_2S+2Cl^-$ (2b);

and (c) oxidizing approximately three-fourths of the copper chloride solution obtained from said leaching (a) to produce cupric chloride according to equation (3) and recycling the cupric chloride to said leaching (a), said equation (3) being as follows:

$2CuCl+FeCl_2+¾O_2+½H_2O \rightarrow 2CuCl_2+FeO.OH$ (3);

(d) leaching the solid copper cement or the copper sulfide precipitate with ferric fluoborate and fluoboric acid to form a copper-containing solution by either reacting the solid copper cement obtained in (b) with ferric fluoborate and fluoboric acid in accordance with equation (4a) or reacting the copper sulfide precipitate obtained in (b) with ferric fluoborate and fluoboric acid in accordance with equation (4b), said equations (4a) and (4b) being as follows:

$$2Fe(BF_4)_3 + Cu \rightarrow 2Fe(BF_4)_2 + Cu(BF_4)_2 \quad (4a)$$

$$4Fe(BF_4)_3 + Cu_2S \rightarrow 4Fe(BF_4)_2 + 2Cu(BF_4)_2 \quad (4b);$$

and (e) electrowinning the copper-containing solution in a diaphragm cell having a cathode and an anode to deposit copper on the cathode in a purity of not less than 99.99% in accordance with equation 5(a), and to equation 5(b) at the anode, and overall equation (5) as follows:

$$Cu(BF_4)_2 + 2e \rightarrow Cu + 2BF_4^- \quad (5a),$$

$$2Fe(BF_4)_2 + 2BF_4^- \rightarrow 2Fe(BF_4)_3 + 2e \quad (5b),$$

and $$2Fe(BF_4)_2 + Cu(BF_4)_2 \rightarrow Cu + 2Fe(BF_4)_3 \quad (5).$$

2. The process of claim 1, further comprising feeding a portion of a solution obtained from said filtering out of the solid copper cement or copper sulfide precipitate in (b) to said oxidizing step (c).

3. process for obtaining purified copper metal from a copper concentrate, said process comprising:

leaching a secondary sulfide copper concentrate ore with ferric fluoborate and fluoboric acid to form a copper-containing solution in accordance with the following equations:

$$CuS + 2Fe(BF_4)_3 \rightarrow Cu(BF_4)_2 + 2Fe(BF_4)_2 + S°;$$

and $$Cu_2S + 4Fe(BF_4)_3 \rightarrow 2Cu(BF_4)_2 + 4Fe(BF_4)_2 + S°;$$

filtering the copper-containing solution to separate insoluble residues containing elemental sulfur and form a filtered solution; and electrowinning the filtered solution in the diaphragm cell having a cathode to deposit copper on the cathode in a purity of not less than 99.99%.

4. The process of claim 3, wherein the secondary sulfide copper concentrate is formed from an ore flotation or copper mattes obtained from pyrometallurgic processing of copper concentrates.

5. The process of claim 3, wherein the secondary sulfide copper concentrated is selected from the group consisting of chalcocite and covellite.

* * * * *